United States Patent [19]

Kim

[11] 3,904,603

[45] Sept. 9, 1975

[54] 2,3,4,5-TETRAHYDRO-4,4-DIALKYL-1H-1,4-BENZODIAZEPINE HALIDES

[75] Inventor: Dong H. Kim, Wayne, Pa.

[73] Assignee: American Home Products Corporation, New York, N.Y.

[22] Filed: Aug. 1, 1974

[21] Appl. No.: 493,808

[52] U.S. Cl............................ 260/239 BD; 424/244
[51] Int. Cl.²........................................ C07D 243/14
[58] Field of Search............................... 260/239 BD

[56] References Cited
UNITED STATES PATENTS

| | | | |
|---|---|---|---|
| 3,244,698 | 4/1966 | Uskokovic et al............ | 260/239 BD |
| 3,384,635 | 5/1968 | Carabateas................... | 260/239 BD |
| 3,431,304 | 3/1969 | Fryer et al.................... | 260/239 BD |

OTHER PUBLICATIONS

Gatta et al., Chem. Abstracts, Vol. 77, Abstract No. 61967g (1972), QD1A51.

Lee, J. Hex. Chem., Vol. 1, pp. 235–238, (1964).

*Primary Examiner*—Alton D. Rollins
*Attorney, Agent, or Firm*—David E. Frankhouser

[57] ABSTRACT

2,3,4,5-Tetrahydro-4,4-dialkyl-1H-1,4-benzodiazepinium halides possess hypotensive activity.

4 Claims, No Drawings

2,3,4,5-TETRAHYDRO-4,4-DIALKYL-1H-1,4-BENZODIAZEPINE HALIDES 2,3,4,5-Tetrahydro-1H-1,4-benzodiazepine, dihydrochloride, is described by Uskokovic et al., J. Org. Chem., 27, 3606 (1962). The 1-methyl-4-aryl derivatives thereof are described by Cheuk-Man Lee, J. Heterocyclic Chemistry, 1, 236 (1964).

The invention sought to be patented comprises chemical compounds of the molecular structure

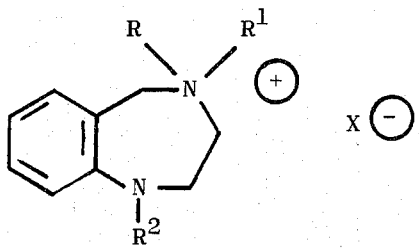

wherein R and $R^1$ are, independently, methyl, ethyl, or propyl; $R^2$ is hydrogen, methyl, ethyl, or propyl; and X is the chlorine, bromine, or iodine anion.

The compounds of the invention are prepared by treating a compound of the formula

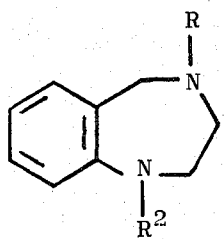

where R and $R^2$ have the meanings as above-defined, with an alkyl halide ($R^1X$). The above-described starting compounds can be prepared by reduction of an appropriately substituted 3H-1,4-benzodiazepine-2,5(1H,4H)dione with lithium aluminium hydride in tetrahydrofuran. [See Uskokovic, J. Org. Chem., 27, 3606 (1962).] 3H-1,4-Benzodiazepine-2,5(1H,4H)dione was prepared according to the methods described by Carabateas and Harris, J. Med. Chem., 9, 6 (1966). This method involves the reaction of isatoic anhydride with glycine ethyl ether hydrochloride in refluxing dimethyl formamide (DMF). In the preparations described herein in the Examples, pyridine was used in place of DMF. This modification improved the yield and simplified the work up procedure. For example, using pyridine in place of DMF, the yield of 3H-1,4-benzodiazepine-2,5(1H,4H)dione was increased from 20% (as reported by Carabateas) to 64%. 3H-1-Methyl-1,4-benzodiazepine-2,5(1H,4H)-dione was prepared in two steps. First, N-methylisatoic anhydride was allowed to react with glycine ethyl ester hydrochloride in refluxing pyridine to give o-(methylamino)hippuric acid ethyl ester. Second, the o-(methylamino)hippuric acid ethyl ester is ring-closed by fusion without solvent.

The following examples are illustrative of the methods of making and using the compounds of the invention:

EXAMPLE I 3H-1,4-Benzodiazepine-2,5(1H,4H)-Dione

A mixture of isatoic anhydride (114.1 g), glycine ethyl ester hydrochloride (105 g) and pyridine (450 ml) was heated under reflux for 7 hr., then chilled in a cold room overnight. Product was collected on a filter and washed with water, then with ethanol several times. Yield 73 g, mp. 328°–330° dec.

EXAMPLE II o-(Methylamino)Hippuric Acid Ethyl Ester

A mixture of N-methylisatoic anhydride (52 g), glycine ethyl ester hydrochloride (44 g) and pyridine (200 ml) was heated under reflux for 3.5 hr. The pyridine was removed under reduced pressure to give an oil. Treatment of the oil with a large amount of water caused separation of solid material which was collected on a filter and washed with water several times to give 61 g of product, mp. 55°–59°. An analytical sample which was obtained by recrystallization from ether melted at 72°–74.5°.

Analysis for: $C_{12}H_{16}N_2O_3$:
Calculated: C, 61.00; H, 6.83; N, 11.86.
Found: C, 60.97; H, 6.96; N, 11.82.

Hydrolysis of o-(methylamino)hippuric acid ethyl ester afforded the corresponding acid. A mixture of 4.5 g of o-(methylamino)hippuric acid ethyl ester, 30 ml of 15% aqueous sodium hydroxide solution and 10 ml of ethanol was heated under reflux for 1 hr. The reaction mixture was cooled and acidified with dilute hydrochloric acid to pH 3. It was extracted with ether 3 times. The combined ether extract was dried over anhydrous $MgSO_4$. Removal of ether in vacuo afforded an oil which solidified on standing. Recrystallization from ether afforded 1.3 g of o-(methylamino)hippuric acid, mp. 119°–122°.

Analysis for: $C_{10}H_{12}N_2O_3$:
Calculated: C, 57.68; H, 5.81; N, 13.46.
Found: C, 57.93; H, 6.00; N, 13.33.

EXAMPLE III 3H-1-Methyl-1,4-Benzodiazepine-2,5(1H,4H)-Dione

Nine grams of o-(methylamino)hippuric acid ethyl ester was fused in an Erlenmeyer flask on a flame for 10 min. After cooling to room temperature, the solid material was dissolved in 20 ml of $CH_2Cl_2$ with warming on a steam bath. Addition of 30 ml of anhydrous ether to the $CH_2Cl_2$ solution, and subsequent chilling in ice caused separation of a precipitate which was collected on a filter and washed with ether to give 3.8 g of the product, mp. 184°–186°.

EXAMPLE IV 3H-4-Methyl-1,4-Benzodiazepine-2,5(1H,4H)-Dione

A mixture of isatoic anhydride (33 g), sarcosine methyl ester hydrochloride (28 g) and pyridine (70 ml) was heated under reflux for 5 hr., then allowed to sit overnight at room temperature. The mixture was chilled in ice, and a precipitate was collected on a filter. The filter residue was washed with pyridine, water, then with ethanol to give 20 g of the product, mp. 243°–246°.

EXAMPLE V

2,3,4,5-Tetrahydro-1H-1,4-Benzodiazepine

Powdered 3H-1,4-benzodiazepine-2,5 (1H,4H)-dione (19.1g) was added in small portions to a slurry of lithium aluminum hydride (11.3 g) in tetrahydrofuran (250 ml) at a rate which causes mild reflux. The resulting mixture was heated under reflux for 7 hr., then allowed to sit overnight. The mixture was treated with 11 ml of water, 11 ml of 15% aqueous NaOH solution, then with 33 ml of water. The inorganic salt was removed by filtration and washed with tetrahydrofuran several times. The filtrate and washings were combined, and evaporated under reduced pressure to give an oil which solidified on standing, giving 15.5 g of product, mp. 88°–93°. Recrystallization from ether improved the mp. to 93°–96°.

Analysis for: $C_9H_{12}N_2$:
Calculated: C, 72.94; H, 8.16; N, 18.90.
Found: C, 73.40; H, 8.31; N, 18.88.

EXAMPLE VI

1-Methyl-2,3,4,5-Tetrahydro-1H,-1,4-Benzodiazepine

1-Methyl-2,3,4,5-tetrahydro-1H-1,4-benzodiazepine was prepared as in Example V from 10.5 g of 1-methyl-3H-1,4-benzodiazepin-2,5(1H,4H)-dione and 6.3 g lithium aluminum hydride, giving 9.0 g of the product.

EXAMPLE VII

4-Methyl-2,3,4,5-Tetrahydro-1H-1,4-Benzodiazepine

4-Methyl-2,3,4,5-tetrahydro-1H-1,4-benzodiazepine was prepared as in Example V from 3H-4-methyl-1,4-benzodiazepine-2,5-(1H,4H)-dione (20 g) and lithium aluminum hydride (12 g).

EXAMPLE VIII

2,3,4,5-Tetrahydro-4,4-Dimethyl-1H-1,4-Benzodiazepinium Iodide

A. To an ether solution of 2,3,4,5-tetrahydro-1H-1,4-benzodiazepine (4.5 g) was added dropwise methyl iodide (4.5 g) diluted with 10 ml of ether with stirring at room temperature. A reaction took place during the addition. The resulting mixture was stirred at room temperature for 5 hr. A precipitate was collected on a filter, and washed with ether, then with ethanol. The filter residue was recrystallized from ethanol to give 2.5 g of product, mp. 196°–198°.

Analysis for: $C_{11}H_{17}IN_2$:
Calculated: C, 43.43; H, 5.64; N, 9.21.
Found: C, 43.64; H, 5.65; N, 9.32.

B. Methyl iodide (0.7 g) diluted with 3 ml of absolute ethanol was added dropwise to an ethanolic solution (7 ml) of 4-methyl-2,3,4,5-tetrahydro-1H-1,4-benzodiazepine (0.8 g). The resulting mixture was stirred at room temperature for 6 hr. Chilling of the reaction mixture caused separation of a precipitate which was collected on a filter and washed with ethanol several times. The product weighed 0.65 g and melted at 201°–203°.

EXAMPLE IX

2,3,4,5-Tetrahydro-1,4,4-Trimethyl-1H-1,4-Benzodiazepinium Iodide 2,3,4,5-Tetrahydro-1,4,4-trimethyl-1H-1,4-benzodiazepinium iodide was prepared as in Example VIII A from 1-methyl-2,3,4,5-tetrahydro-1H-2,4-diazepine (2.4 g) and methyl iodide (4.2 g) in ether. The crude product (2.0 g) was recrystallized from ethanol, mp. 155°–156°.

Analysis for: $C_{12}H_{19}IN_2$:
Calculated: C, 45.29; H, 6.02; N, 8.81.
Found: C, 45.08; H, 5.97; N, 8.71.

EXAMPLE X

1,4-Diacetyl-2,3,4,5-Tetrahydro-1H-1,4-Benzodiazepine

To a mixture of 2,3,4,5-tetrahydro-1H-1,4-benzodiazepine (18 g) and pyridine (70 ml) was added dropwise acetic anhydride (22 g) at room temperature. The resulting mixture was heated on a steam bath for 1 hr. Removal of pyridine under reduced pressure afforded an oil which solidified on standing. Recrystallization from ether with an addition of a small amount of ethanol gave 28 g of the product, mp. 119°–120°.

Analysis for: $C_{13}H_{16}N_2O_2$:
Calculated: C, 67.22; H, 6.94; N, 12.06.
Found: C, 67.47; H, 7.00; N, 12.07.

EXAMPLE XI

1,4-Diethyl-2,3,4,5-Tetrahydro-1H-1,4-Benzodiazepine 1,4-Diacetyl-2,3,4,5-tetrahydro-1H-1,4-benzodiazepine (12 g) was reduced with lithium aluminum hydride (5.7 g) in THF (200 ml) heating under reflux for 5 hr, then worked-up by a standard procedure, giving 9.2 g of the product as an oil.

EXAMPLE XII

1,4-Diethyl-2,3,4,5-Tetrahydro-4-Methyl-1H-1,4-Benzodiazepinium Iodide 1,4-Diethyl-2,3,4,5-tetrahydro-4-methyl-1H-1,4-benzodiazepinium iodide was prepared as in Example VIII B from 1,4-diethyl-2,3,4,5-tetrahydro-1H-1,4-benzodiazepine (5.7 g) and methyl iodide (4.3 g) in ether. The product was recrystallized from ethanol, mp. 174°–176°.

Analysis for: $C_{14}H_{23}IN_2$:
Calculated: C, 48.56; H, 6.70; N, 8.09.
Found: C, 48.19; H, 6.62; N, 8.10.

EXAMPLE XIII

A group of at least six rats is rendered hypertensive by applying a figure-of-eight legature around one kidney and performing a contralateral nephrectomy. Blood pressure will stabilize at a hypertensive level after approximately six weeks. Systolic pressure is measured by an indirect technique using a Decker Caudal Plethysmograph.

Each rat is given the test compound by the oral or I.P. route. Blood pressure is read prior to drug administration and at 2 and 24 hours thereafter. A control group of rats is run with each group of rats treated with the test compound. The results of the treated group are compared to the results of the untreated group by statistical analysis. When tested according to the above-described method, the following compounds gave a hypertensive effect at an oral dose of 75 mg/kg.:

2,3,4,5-Tetrahydro-4,4-dimethyl-1H-1,4-benzodiazepinium iodide;

2,3,4,5-Tetrahydro-1,4,4-trimethyl-1H-1,4-benzodiazepinium iodide;

1,4-Diethyl-2,3,4,5-tetrahydro-4-methyl-1H-1,4-benzodiazepinium iodide.

What is claimed is:

1. A compound of the formula

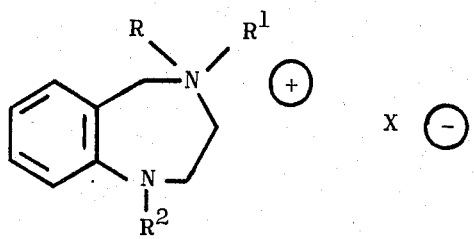

wherein R and $R^1$ are, independently, methyl, ethyl, or propyl; $R^2$ is hydrogen, methyl, ethyl, or propyl; and X is the chlorine, bromine, or iodine anion.

2. A compound as defined in claim 1 which is: 2,3,4,-5-Tetrahydro-4,4-dimethyl-1H-1,4-benzodiazepinium iodide.

3. A compound as defined in claim 1 which is: 1,4-Diethyl-2,3,4,5-tetrahydro-4-methyl-1H-1,4-benzodiazepinium iodide.

4. A compound as defined in claim 1 which is: 2,3,4,-5-Tetrahydro-1,4,4-trimethyl-1H-1,4-benzodiazepinium iodide.

* * * * *